July 7, 1970 D. P. DORSEY 3,519,736

APPARATUS FOR PREVENTING RECEIVER RECORDING OF PARTIAL MULTIPLEXED MESSAGE TRANSMISSIONS

Filed May 18, 1967 2 Sheets-Sheet 1

INVENTOR
Denis P. Dorsey
BY Eugene M. Whitacre
ATTORNEY

INVENTOR
Denis P. Dorsey
BY Eugene M. Whitacre
ATTORNEY

United States Patent Office 3,519,736

Patented July 7, 1970

3,519,736

APPARATUS FOR PREVENTING RECEIVER RECORDING OF PARTIAL MULTIPLEXED MESSAGE TRANSMISSIONS

Denis P. Dorsey, Levittown, Pa., assignor to RCA Corporation, a corporation of Delaware Filed May 18, 1967, Ser. No. 639,322
Int. Cl. H04n 7/08, 5/76
U.S. Cl. 178—5.6 11 Claims

ABSTRACT OF THE DISCLOSURE

Apparatus for preventing receiver recording of multiplexed messages already partially transmitted when recording is directed includes bistable multivibrator and pulse triggering circuits which cooperate to delay energization of the receiver's recording circuits until after the remainder of the message transmissions have ended and before they are to begin again. The messages to be recorded may be transmitted during the time intervals between successive horizontal sync pulses within the vertical blanking interval of each field.

Figure 1:
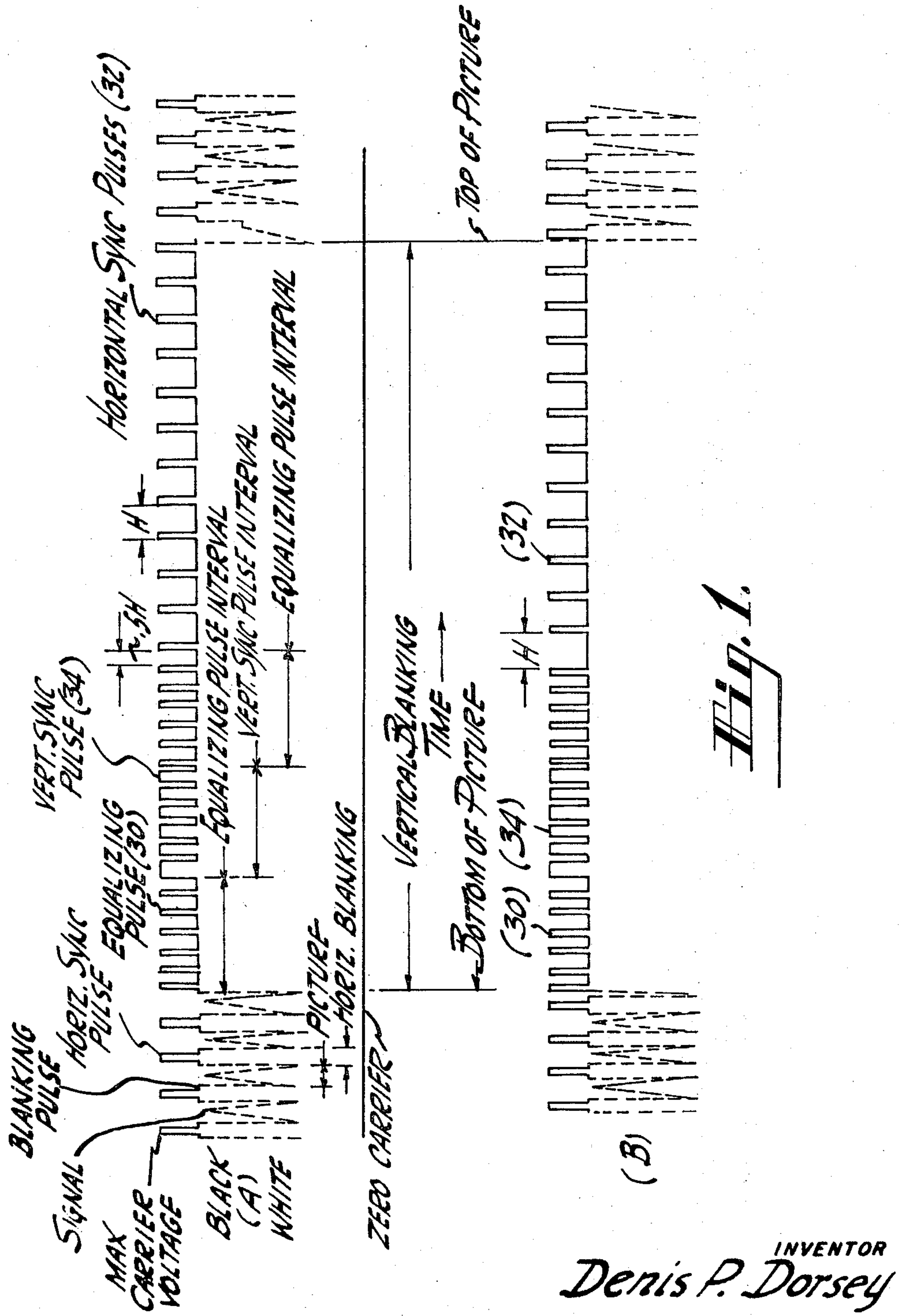

This invention relates to the transmission of special message information to the public using existing television facilities, without interfering with regular television program service.

A system which accomplishes such transmission is disclosed in pending application, Ser. No. 551,084, filed May 18, 1966, and entitled "Television Message System." One embodiment of the system therein described sequentially multiplexes message representative line scan video signals developed by an auxiliary pick-up camera with primary program video signals developed by a studio pick-up camera during predetermined portions of the vertical blanking interval thereof, at a rate of one line scan signal per message per field of program information. More particularly, these video signals are inserted during a time interval corresponding to that between successive horizontal synchronizing pulses within the vertical blanking interval of each program field. The composite signal is then transmitted to the home receiver in the usual manner, where apparatus is additionally included to separate the message signals from the rest of the received signal. The separated message signals may be recorded using a thin window type cathode ray tube and an associated Electrofax printer, while the primary program signals are displayed on the kinescope of the home receiver in the conventional way. As is described in the Ser. No. 551,084 application, the thin window tube displays one horizontal line of message information, which is printed on the advancing paper of the Electrofax printer. Since the kinescope of the home receiver is cut off during the vertical blanking interval, the message information included therein is not displayed and thus does not interfere with the regular program picture as seen by the viewer.

The Ser. No. 551,084 application additionally discloses the use of category code signals to identify the transmitted message informations as to type. These signals permit the home viewer to condition his receiving unit so as to respond only to those code signals which tag the messages that are of particular interest to him.

In accordance with an embodiment of the present invention, apparatus is provided for the television message system receiver to synchronize the start of the auxiliary message recording with the beginning of a desired message transmission. More particularly, such apparatus inactivates the recording circuits of the message system receiver where the desired message has already been partially transmitted when recording is directed. The apparatus maintains these circuits in their inactive condition until after the message transmissions have ended, at which time the apparatus releases its control and permits the recording to start when the transmissions begin again. The home viewer is thus spared the annoyance of receiving an incomplete message readout, as well as the added cost of duplicating previously recorded information. As will become clear hereinafter, such apparatus may include a bistable multivibrator and a pulse triggering circuit. The pulse trigger is generated only in the absence of the desired message, and causes a multivibrator transition which conditions a coincidence gate for the recording circuits of the message system receiver. Upon subsequent receipt of the message of interest, the recording circuits will then be activated and the desired message will be printed in its entirety.

For a better understanding of the present invention, reference is had to the following description taken in connection with the accompanying drawings and with the television message system disclosed in application No. 551,084, and its scope will be pointed out in the appended claims.

Figure 2:
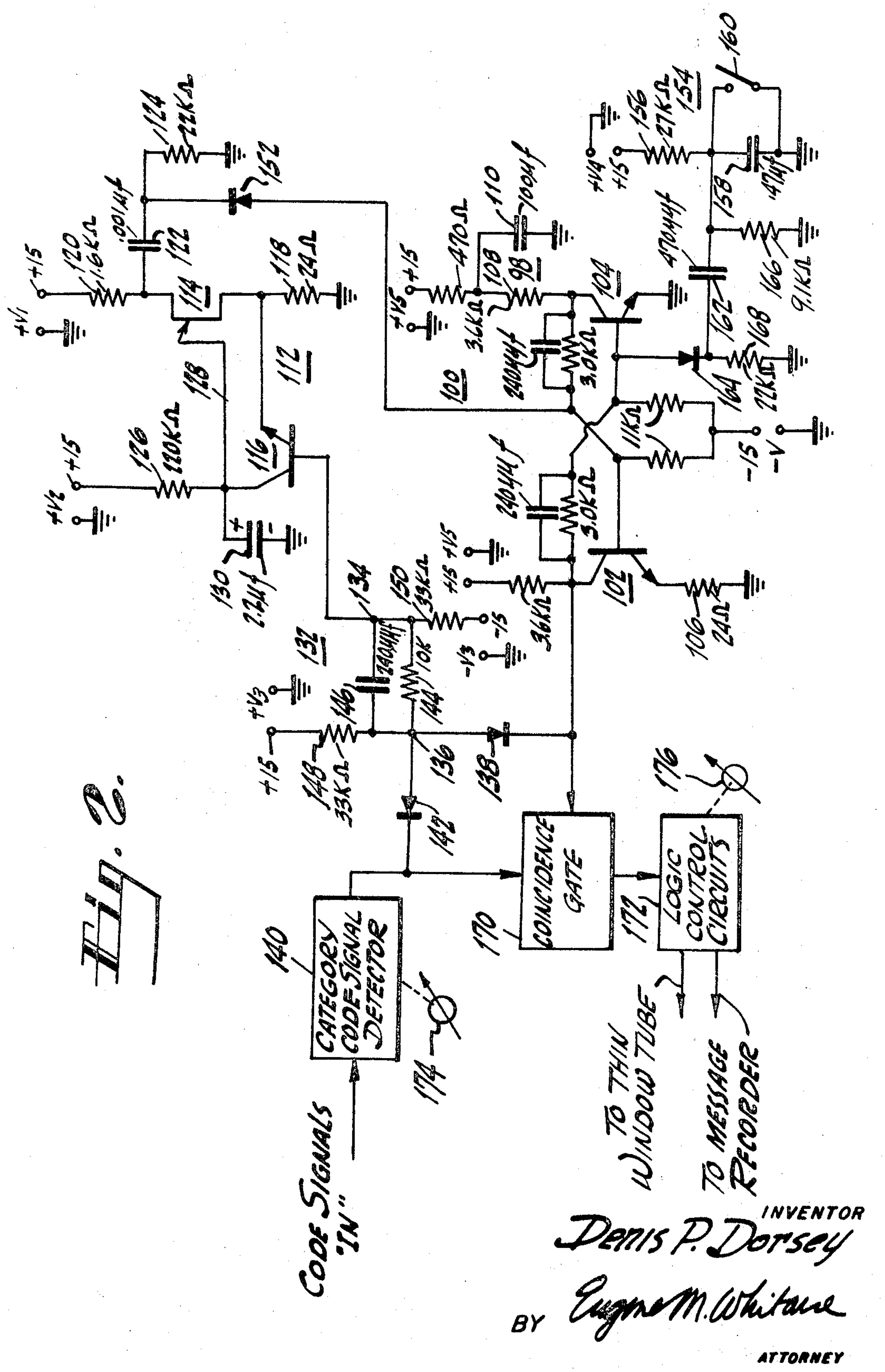

Referring to the drawings:

FIG. 1 is a series of waveforms illustrating the vertical blanking interval for alternate fields of an interlaced television signal; and FIG. 2 is a schematic circuit diagram, partly in block form, of apparatus embodying the present invention.

In FIG. 1, the waveforms A and B respectively illustrate (though not necessarily to scale) the vertical blanking interval for the even and odd fields of the interlaced television signal. As is well known, each of these intervals includes equalizing pulses 30, horizontal synchronizing pulses 32, and serrated vertical synchronizing pulses 34. The equalizing pulses 30 function to maintain vertical synchronization of a television receiver even though two interlaced scanning fields are utilized, while the horizontal synchronizing pulses 32 maintain horizontal synchronization of the receiver during the latter portion of each of the vertical blanking intervals. The serrated vertical synchronizing pulses 34 maintain horizontal synchronization of the receiver during the vertical synchronizing pulse period.

The composite synchronizing signal depicted in waveforms A and B is also used to synchronize the horizontal deflection in the thin window tube of the above-described television message system receiver. When used in such a message system environment, the composite synchronizing signal additionally includes auxiliary video message signals located within the vertical blanking interval, and may further include message identifying code signals.

As described in the Ser. No. 551,084 application the auxiliary message signals are inserted into the vertical blanking interval during a time interval between successive horizontal synchronizing pulses. The identifying code signals may be similarly isserted, and, as an illustration, within a different time interval. Transmission of a code signal of frequency $f_1$, for example, in horizontal interval $S_1$ may indicate that transmission of stock market information will follow in a succeeding horizontal interval $S_2$, such as the next succeeding horizontal interval. Transmission of a code signal of frequency $f_2$ in that $S_1$ interval may then indicate that transmission of civil defense information will be forthcoming in the succeeding horizontal interval $S_2$. Transmission of frequencies $f_3$, $f_4$, etc. in interval $S_1$ may similarly indicate that transmission of other types of auxiliary information are next.

As is also described with respect to certain receiver embodiments of the 551,084 application, the received composite video signal is coupled to a thin window type cathode ray tube. Deflection signals are developed for its cathode ray beam, as are beam intensifying signals which are timed to coincide with the application to the tube of the message signal desired to be recorded. These intensifying signals, more specifically, are developed by logic control circuits in response to the presence in the composite signal of the message selected for recording by the viewer and characterized by a corresponding category code and message interval location. One line of auxiliary information will be displayed on that tube for each television field, and can be recorded using Electrofax processing techniques, for example. The logic circuits further detect the end of the message transmission and respond by shutting down the message recorder and the thin window tube. It will be readily apparent that should the viewer address his receiver to print out a message which unbeknownst to him has already been partially transmitted, that portion of the message will be lost and only the remainder will be recorded. In order to receive that lost portion, the viewer would have to start up his recording circuits for a subsequent transmission, they being shut down by the logic circuits upon completion of the transmitted message, so that the latter recovered copy, though being a complete record, will unnecessarily duplicate information that had already been received. This results in wasted recording paper.

The apparatus shown in FIG. 2 is intended to be connected to the logic control circuits of the above-described television message system. As will subsequently become clear, the apparatus operates to inhibit those circuits if the message system receiver is addressed by the viewer during transmission of the desired information. This, in turn, disables the thin window tube and printer readout of the system, and thereby prevents an incomplete message recording. The apparatus additionally operates to automatically enable the logic control circuits after that transmission has ended, so that a complete readout will result on the next following transmission of the desired information. The apparatus further operates to enable those circuits if the viewer addresses his receiver at a time when the desired message is not being transmitted. When the message is eventually received, the logic circuits will then direct the thin window tube and message printer to provide a hard copy readout of the selected information.

In FIG. 2, a bistable multivibrator circuit 100 is provided. Transistors 102 and 104 operate as the active devices of the circuit 100. A resistor 106 is included in the emitter electrode circuit of the transistor 102 to unbalance the multivibrator 100. This ensures that transistor 102 will be "OFF" and transistor 104 "ON" when the circuit 100 is energized. A resistor 108 and a capacitor 110 are included in the collector electrode circuit of the transistor 104 to form a time constant network 98. The network 98 insures that the steady state voltage at the collector electrode of the transistor 102 will be reached gradually and not abruptly when power is applied to the circuit 100. The reason for this will become clear below.

A pulse triggering circuit 112 is also provided in the apparatus of FIG. 2. The circuit 112 includes a unijunction transistor 114 and a conventional two-junction NPN transistor 116 (hereafter "transistor 116"). The base-one electrode of the unijunction transistor 114 and the emitter electrode of the transistor 116 are connected together, and through a resistor 118 to a point of reference or ground potential. The base-two electrode of the unijunction transistor 114 is coupled to a source of energizing potential $+V_1$ by means of a resistor 120. It is also coupled to ground via a capacitor 122 and a resistor 124 serially connected in that order. The collector electrode of the transistor 116 is coupled by a resistor 126 to a potential source $+V_2$ and by a direct connection 128 to the emitter electrode of the unijunction transistor 114. A capacitor 130 is also included in the circuit 112, and couples the collector electrode of the transistor 116 to ground.

A bias control circuit 132 is additionally provided in the apparatus of FIG. 2. The circuit 132 has an output terminal 134 directly connected to the base electrode of the transistor 116 in the triggering circuit 112. It also has an input terminal 136 which is coupled to the collector electrode of the transistor 102 in the multivibrator 100 by a first diode 138, and to a category code signal detector circuit 140 by a second diode 142. The anode electrode of each of these diodes 138, 142 is connected to the terminal 136. A resistor 144 and a capacitor 146 are connected in parallel between the terminals 134 and 136 of the bias circuit 132. Substantially equal valued resistors 150 and 148 respectively couple the terminals 134 and 136 to energizing sources of opposite polarity potential $-V_3$ and $+V_3$.

A diode 152 is further included in the apparatus of FIG. 2. It couples the pulse triggering circuit 112 to the bistable multivibrator 100. The anode electrode of the diode 152 is connected to the base electrode of the multivibrator transistor 102, while the cathode electrode of the diode 152 is connected to the junction between the trigger circuit capacitor 122 and the resistor 124.

An input trigger circuit 154 is additionally provided in the FIG. 2 apparatus. It includes a resistor 156, a capacitor 158 and a normally open switch 160, which when closed short circuits the capacitor 158. The resistor 156 and capacitor 158 are serially connected between a potential source $+V_4$ and ground, with the junction between the two being coupled to the base electrode of the multivibrator transistor 104 by means of a series capacitor 162-diode 164 combination. A resistor 166 couples one side of the capacitor 162 to ground. Another resistor 168 does the same to the junction of the other side of the capacitor 162 with the cathode electrode of the diode 164.

A coincidence gate circuit 170 is finally provided in the apparatus of FIG. 2. This circuit 170 is coupled to receive control signals from the collector electrode of the transistor multivibrator 102 and from the category code signal detector 140. The gate circuit 170 is enabled by an abrupt, positive going signal transition at the collector electrode of the transistor 102, and is of a type that produces an output signal upon receipt of a positive going pulse from the detector 140 when in this enabled condition. This output signal is applied to the logic control circuits 172 of the message system receiver, which respond by energizing the thin window tube and message recorder of the receiver (not shown).

It will be understood that the signal and potential polarities herein described have been selected for purposes of illustration only, and in no ways restrict the teachings of the present invention. It will also be understood that the category code signal detector 140 is a unit which produces a positive going output pulse only when the transmitted message identifying code corresponds to that associated with the message selected for recording by the viewer. Viewer control of the detector 140 is by means of a code selector switch 174 which directs, for example, various tuned circuits to pass only that code signal having a frequency burst associated with the desired message. A similar selector switch 176 may be included within the logic circuit unit 172. Its function is to gate the energization of the thin window tube and message recorder only during that vertical blanking interval location in which the desired message is inserted.

The operation of the apparatus of FIG. 2 will first be described for the case where the desired message is already being transmitted when the home viewer directs his receiver to record that message. The operation for the case where the desired message is not being transmitted at that time will be described at a later point in this specification. Consider now the first case. When the message receiver (including the apparatus of FIG. 2) is turned on, the multivibrator transistor 102 will become cut-off and the voltage at its collector electrode will gradually rise to a potential somewhat less than that of the positive supply $+V_S$. This is due to the control exerted by the resistor 106 in unbalancing the multivibrator 100 and by the time constant network 98 in slowing down the transition. This resulting transition is, therefore, insufficient to enable the coincidence gate 170 which, as was previously mentioned, requires an abrupt transition to be enabled. No output signal will then be developed by the gate circuit 170 upon subsequent receipt of the pulse signal from the code signal detector 140. The logic control circuits unit 172 will thus be inhibited. Were this arrangement otherwise, the turning on of the receiver might itself serve to energize its thin window tube and recording circuits, and cause a partial message to be printed as an output copy.

With transistor 102 in its "OFF" condition, the bias control circuit 132 supplies a positive voltage to the base electrode of the NPN transistor 116. This voltage saturates the transistor 116 and effectively short circuits to ground the capacitor 130 connected to its collector electrode. The current that flows from the source $+V_2$ through the resistors 126 and 118 at this time establishes a voltage at the collector electrode of the transistor 116 which is less than the threshold potential at which the unijunction transistor 114 will conduct. This voltage thus holds the unijunction transistor 114 in its non-conducting condition. The capacitor 122 coupled to the base-two electrode of the unijunction transistor 114 is then charged positively by the current flowing from the source $+V_1$ through the resistors 120 and 124. These circumstances remain unchanged during transmission of the message informations. This is because the positive going signal pulses supplied to the bias circuit 132 by the signal detector 140 once each television field in response to the transmitted message code extend in a direction which tends to further saturate the already saturated transistor 116.

It will be readily apparent that to produce the abrupt, positive going signal transition required to enable the gate 170 (and thereby the logic circuits unit 172), the transistor 102 must first be switched to its "ON" state, and then back to its "OFF" state. As will now become clear, these signal switchings are produced by the trigger circuits 154 and 112, respectively.

Consider, first, the trigger circuit 154. It will be noted that it comprises a normally open switch 160 and a capacitor 158 which has become positively charged by current flow from the supply $+V_4$ through the resistor 156. When the viewer desires to record the message associated with the settings of his selectors 174 and 176, he closes the switch 160. The resulting discharge of the capacitor 158 produces a pulse of negative polarity, which is coupled to the base electrode of the multivibrator transistor 104 by way of the capacitor 162 and the diode 164. This negative pulse turns "OFF" the previously "ON" transistor 104. The regenerative action of the multivibrator 100 correspondingly turns "ON" the previously "OFF" transistor 102. A negative going signal transition thus occurs at the collector electrode of the transistor 102, which, when coupled through the diode 138 and the bias supply 132 to the base electrode of the transistor 116, is sufficient to switch that transistor 116 from its saturated condition to its non-conducting state. The effective short circuit across the capacitor 130 is thereby removed, and the capacitor 130 responds by charging up towards the potential of the $+V_2$ supply through the resistor 126.

The resistor 126 and the capacitor 130 are chosen to provide a time constant which is much larger than the time of one television field. More particularly, they are chosen so that the capacitor 130 will charge to a voltage less than the threshold potential of the unijunction transistor 114 in one television field. Since the detector 140 provides a positive going signal pulse at a rate of one per television field when the desired message is being received, it will be appreciated that the unijunction transistor 114 will still be in its original non-conductive condition when this signal pulse is supplied. It will also be appreciated that the unijunction transistor 114 remains in that nonconductive condition thereafter, since the signal pulse (which is coupled through the diode 142 and the bias supply 132 to the base electrode of the transistor 116) is of a polarity to once again saturate the transistor 116 and short circuit the capacitor 130 to ground. The build-up of charge on the capacitor 130 and its subsequent discharge before the threshold potential is reached effectively prevents conduction of the unijunction transistor 114 during the period when detector pulses are supplied, i.e. during message transmissions. The capacitor 122 in the base-two electrode circuit of the unijunction transistor 114 thus retains its positive charge during the message transmissions, and no subsequent discharge of its voltage will be developed to change the conductivity conditions of the multivibrator transistors 102 and 104. It will therefore be seen that closing the switch 160 in the trigger circuit 154 during the transmission of the desired message information will not cause enabling of the coincidence gate 170 since no abrupt, positive going signal transistion will be developed at the collector electrode of the transistor 102. This, therefore, prevents the recording of the message then in transmission since without the coincidence, the thin window tube and message recorder will be disabled through the inhibited logic control circuits unit 172.

(In this respect, it will be noted that the pulse trigger circuit 154 and, more particularly, the switch 160 operates as another control by which the viewer can discriminate against undesired message informations. More particularly, it will be seen that by not activating this switch 160 until after the message selectors 174 and 176 have been set, the viewer can prevent energization of his receiver's recording circuits which might otherwise occur without this control if, in adjusting his selectors 174 and 176, he happened to hit upon a combination of settings which correspond to an unwanted message then in transmission.)

Upon completion of the transmitted message information, the following happens. The detector 140 senses the absence of the appropriate identifying code signals and stops providing positive going pulses to the base electrode of the trigger circuit transistor 116 as a response. The low voltage signal present at the collector electrode of the "ON" multivibrator transistor 102 at this time and the bias supply 132 then cooperate to keep that transistor 116 in its non-conductive condition. The capacitor 130, as a result, charges up toward the potential $+V_2$ supply and, since no positive pulses from the signal detector 140 exist to discharge it, will eventually charge up to the threshold potential of the unijunction transistor 114. This potential is approximately one-half the difference between its base-two and base-one electrode supply voltages, which in the apparatus of FIG. 2 is $+\frac{1}{2}V_1$. To ensure that the transmitted message has in fact ended, and that the absence of the positive going pulses from the detector 140 is not due to an inadvertent failure to transmit category code signals along with the auxiliary message information, the resistor 126 is chosen with respect to the capacitor 130 such that the capacitor 130 charges to this $+\frac{1}{2}V_1$ potential in a time interval equal to that of ten television fields. It is thus assumed that any inadvertent absence of a category code signal will be cured in a subsequent transmission, and that a prolonged absence of ten field intervals, for example, indicates that a complete transmission has truly occurred.

When the voltage on the capacitor 130 reaches this $+\frac{1}{2}V_1$ potential, the unijunction transistor 114 is rendered conducting. This conduction effectively dis charges the capacitor 122 in the base-two electrode circuit of the unijunction transistor 114. This discharge, in turn, produces a negative going pulse signal, which is coupled through the diode 152 to the base electrode of the multivibrator transistor 102. The transistor 102 responds by switching from its "ON" to its "OFF" condition, while the regenerative action of the multivibrator 100 switches the transistor 104 from its "OFF" to its "ON" state. The abrupt signal transition that results at the collector electrode of the transistor 102 is coupled to the coincidence gate 170 and is of the proper positive polarity to enable the circuit 170. The positive signal pulse developed by the code signal detector 140 on receipt of the first line of desired message information which is next transmitted will thus be coupled through the enabled gate 170 to the logic control circuits unit 172. These circuits 172 respond to activate the thin window tube and message recorder of the television message system receiver, so as to record the auxiliary information at the rate of one line of information per television field. The logic circuits unit 172 responds to a later supplied signal indicating the end of this new message transmission, to shut down the display tube and recording circuits of the system until activated once again by the combination of the proper code signal (selected by the control 174), the proper blanking interval location (selected by the control 176), and the closing of the trigger switch 160.

It will be noted that the operation described immediately above is substantially the same where the switch 160 is closed between complete message transmissions. That is, the negative going signal produced at the collector electrode of the multivibrator transistor 102 upon closing the switch 160 removes the short circuit across the capacitor 130, permits that capacitor 130 to charge towards a voltage ($+V_2$) which exceeds the threshold potential of the unijunction transistor 114 ($+\frac{1}{2}V_1$), and discharges the capacitor 122 to re-trigger the transistor 102, and thereby produce the abrupt, positive going signal transition necessary to enable the coincidence gate 170. That positive going signal transition also re-saturates the transistor 116, turns off the unijunction transistor 114, and permits the trigger capacitor 122 to charge up once again, thus readying the apparatus of FIG. 2 for another sequence of events which culminate in the energization of the thin window tube and recording circuits of the message system in a period before the desired message is received.

The operation of the apparatus of FIG. 2 may be summarized as follows: (1) the thin window tube and recording circuits of the message system receiver described in the Ser. No. 551,084 application will be energized only when the logic control circuits unit 172 is in an enabled condition; (2) that unit 172 will only be enabled when the coincidence gate 170 is enabled; (3) the gate 170 will be enabled only by an abrupt, positive going signal transition coupled to it from the collector electrode of the multivibrator transistor 102; (4) since the transistor 102 is initially non-conducting and its collector electrode is at a relatively high positive potential, that transistor must be rendered conducting, and then non-conducting once again in order to cause the abrupt, positive going signal transition at its collector electrode; (5) the closing of the switch 160 in the trigger circuit 154 switches the transistor 102 from its initial non-conducting condition to its conducting condition; (6) if the category code detector 140 produces no pulse signals for a predetermined time interval after closing the switch 160, thereby indicating an absence of auxiliary message transmissions, the pulse trigger circuit 112 responds to the change in conductivity states of the transistor 102 to switch it back from its conducting to its non-conducting condition; and (7) if on the other hand, the category code detector 140 does produce pulse signals during this interval, indicating the presence of message transmissions, the pulse trigger circuit will be rendered inoperative and will not switch the transistor 102 back to its non-conducting state.

It will be readily apparent from the above summary description, therefore, that the thin window tube and recording circuits of the message system receiver will not be energized if the home viewer closes the trigger switch 160 during a period of message transmission. It will additionally be apparent that these display units will automatically become energized after the transmission has ended. It will further be apparent that they will also be energized if the viewer closes the switch 160 between message transmissions. The apparatus of FIG. 2 thus provides an automatic control to ensure that messages desired by the viewer will not be recorded in partial form simply because he happened to address his receiver at a time when the desired messages were already being transmitted.

What is claimed is:

1. For use in conjunction with a television message system of the type wherein message representative line scan video signals are transmitted and repeated at periodic intervals, an electronic circuit comprising:

means for supplying a source of input signals, the presence of which indicates message information transmission;

a bistable multivibrator having an input terminal and arranged to exhibit a first conductivity condition at an output terminal thereof;

a pulse generating circuit having an input terminal and an output terminal;

control means coupled between said signal source and the input terminal of said last mentioned circuit, and operable to cause said circuit to generate a pulse at its said output terminal in response to the absence of said input signal for a predetermined time interval;

and means coupling said output terminal of said circuit to said input terminal of said multivibrator, to switch said multivibrator in response to the generation of said pulse from exhibiting said first conductivity condition at said multivibrator output terminal to exhibit a second conductivity condition thereat.

2. Apparatus as defined in claim 1 wherein said pulse generating circuit includes an energized charge storing means, and wherein said control means includes means for de-energizing said charge storing means in response to said input signal absence to generate said pulse for multivibrator switching.

3. Apparatus as defined in claim 1 wherein said pulse generating unit includes a capacitor and a unijunction transistor in one of a first and second conductivity conditions cooperating therewith to charge said capacitor to a relatively fixed potential, and wherein said control means includes means for switching said unijunction transistor to the other of said first and second conductivity conditions in response to said input signal absence to discharge said capacitor, thereby generating said pulse for multivibrator switching.

4 Apparatus as defined in claim 1 wherein said pulse generating circuit includes an energized charge storing means, and wherein said control means includes a capacitor and a bi-junction transistor in one of a first and second conductivity conditions cooperating therewith to charge said capacitor to a potential sufficient to de-energize said charge storing means in response to said input signal absence, thereby generating said pulse for multivibrator switching.

5. Apparatus as defined in claim 1 wherein said pulse generating circuit includes a normally non-conductive uni-junction transistor having input, output and control electrodes and a charged capacitor connected in circuit across said first two mentioned electrodes, and wherein said control means couples to said last mentioned electrode to render said transistor conductive and thereby discharge said capacitor in a time interval substantially corresponding to the time of said predetermined input signal absense.

6. Apparatus as defined in claim 5 wherein said control means includes a normally conductive bi-junction transistor having input, output and control electrodes and a capacitor connected in circuit across said first two of said last three mentioned electrodes, means coupling said second of said last three mentioned electrodes to said third of said first three mentioned electrodes and means coupling said third of said last three mentioned electrodes to said signal source to render said bi-junction transistor non-conductive in response to said input signal absence.

7. For use in conjunction with a television message system of the type wherein message representative line scan video signals developed by an auxiliary video pick-up device and sequentially multiplexed with regular television program video signals developed by a primary video pick-up device during predetermined portions of the vertical blanking interval thereof at a rate of one line scan signal per message per field of program information are displayed at said rate by a cathode ray tube having an electron beam in response to an order directing said display by the television message system operator, apparatus for preventing said display when said order is given during a message display period, comprising:

a bistable multivibrator having an input terminal and arranged to exhibit a first conductivity condition at an output terminal thereof;

a pulse generating circuit having an input terminal and an output terminal;

a source of input signals, the presence of which is indicative of the receipt of multiplexed message signals to be displayed and the absence of which is indicative of the absence of said multiplexed message signals;

control means coupled between said signal source and said input terminal of said last mentioned circuit, and operable to cause said circuit to generate a pulse at its said output terminal in response to the absense of said input signals for a predetermined time interval;

means coupling said output terminal to said circuit to said input terminal of said multivibrator, to switch said multivibrator in response to the generation of said pulse from exhibiting said first conductivity condition at said multivibrator output terminal to exhibit a second conductivity condition thereat;

and means responsive to said switch in multivibrator conductivity to energize the cathode ray tube of said message system to display subsequently received multiplexed message signals.

8. Apparatus as defined in claim 7 wherein said pulse generating circuit includes:

first and second terminals respectively coupled to a source of operating potential and a point of reference potential;

a unijunction transistor having base-one, base-two and emitter electrodes;

a first resistor coupling said base-one electrode to said second terminal;

a second resistor coupling said base-two electrode to said first terminal;

a direct current connection from said emitter electrode to said input terminal of said circuit;

a first capacitor coupling said base-two electrode to said output terminal of said circuit; and a third resistor coupling said output terminal of said circuit to said second terminal;

wherein said control means includes:

a bijunction transistor having emitter, base and collector electrodes;

a direct current connection from said bi-junction emitter electrode to said unijunction base-one electrode;

means coupling said base electrode to said signal source;

a fourth resistor coupling said collector electrode to said first terminal;

a second capacitor coupling said collector electrode to said second terminal; and a direct current connection from said collector electrode to said input terminal of said pulse generating circuit;

and wherein said means coupling said pulse generating circuit output terminal to said multivibrator input terminal includes a diode having an anode electrode coupled to said multivibrator input terminal and a cathode electrode coupled to said pulse circuit output terminal.

9. Apparatus as defined in claim 8 wherein said last mentioned means includes a gate circuit responsive to the coincidence between said second conductivity condition of said multivibrator and the presence of said message indicating input signals to enable said cathode ray tube to display said multiplexed message signals.

10. In a receiver for a television message system of the type in which lines of an auxiliary message signal are transmitted during the vertical blanking interval of a transmitted primary television signal at a rate of one line per message per field of program material, and then repeated at periodic intervals, apparatus comprising:

first means for actuating said receiver to display said auxiliary message lines; and second means for preventing the display of said auxiliary lines if the receiver is actuated during the transmission of said message signal and for conditioning said receiver to display said lines in their entirety during a subsequent transmission thereof.

11. Apparatus as defined in claim 10 for use in a television message system in which a plurality of message signals are transmitted during said vertical blanking interval, wherein said first means includes means for displaying auxiliary message lines associated with a desired message signal to the exclusion of all other auxiliary lines, and wherein said seocnd means includes means for preventing the display of said auxiliary lines associated with the desired message if the receiver is actuated during the transmission thereof.

References Cited

UNITED STATES PATENTS

| | | | |
|---|---|---|---|
| 2,873,315 | 2/1959 | Fricks | 178—69.5 |
| 2,874,213 | 2/1959 | Beers | 178—5.6 |
| 3,112,361 | 11/1963 | Kubota et al. | 178—6.6 |
| 3,369,073 | 2/1968 | Scholz | 178—6.6 |

ROBERT L. GRIFFIN, Primary Examiner

R.L. RICHARDSON, Assistant Examiner

U.S. Cl. X.R.

178—5.8, 6.6; 307—247